Nov. 5, 1935.  W. H. FARNSWORTH  2,019,488
PURIFYING PROCESS FOR MAGNESIUM PRODUCTS
Filed July 19, 1932
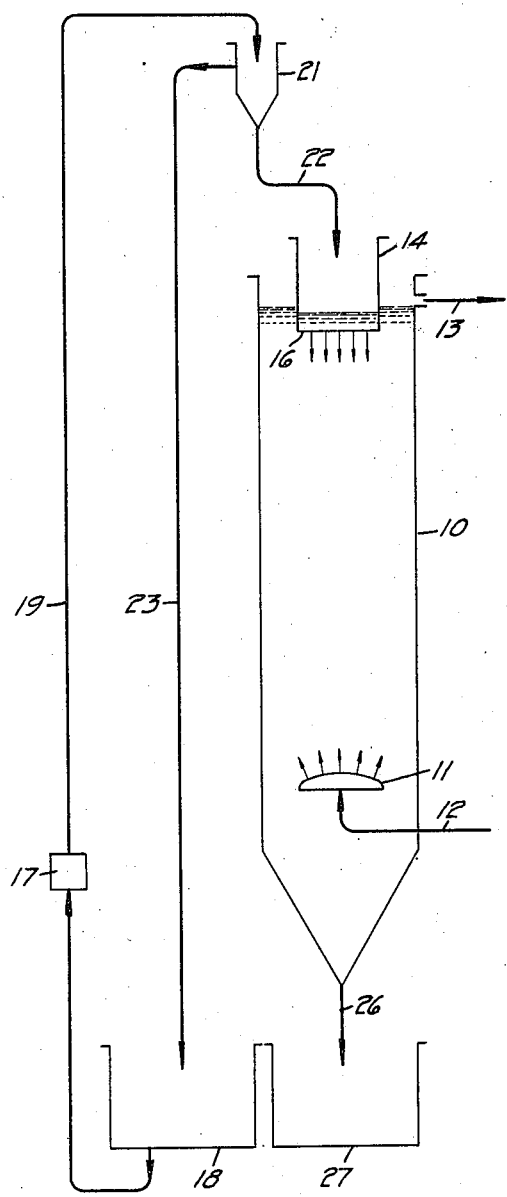
INVENTOR.
WILLIAM H. FARNSWORTH
BY
ATTORNEYS.

Patented Nov. 5, 1935

2,019,488

UNITED STATES PATENT OFFICE 2,019,488

PURIFYING PROCESS FOR MAGNESIUM PRODUCTS

William H. Farnsworth, San Mateo, Calif., assignor to Marine Chemicals Company, Ltd., San Francisco, Calif., a corporation of Delaware Application July 19, 1932, Serial No. 623,369

3 Claims. (Cl. 23—201)

This invention relates generally to the purification of materials containing undesired ingredients, and is useful in certain industrial processes for the manufacture of uncontaminated products, such as relatively pure magnesium-hydroxide or other magnesium products.

It is an object of this invention to devise a process of the above character, which will make possible the purification of certain materials without the use of elaborate equipment, such as conventional counterflow washers, filters, centrifuges or the like, such as have been employed in the past.

It is a further object of the invention to devise a method which will enable purifying of materials having relatively low or negligible settling rates in water, as for example magnesium hydroxide as precipitated from brines containing magnesium salts.

Further objects of the invention will appear from the following description in which the preferred embodiments of my process and apparatus have been set forth in detail in conjunction with the accompanying drawing. It is to be understood that the appended claims are to be accorded a range of equivalents consistent with the state of the prior art.

In the following description my process and apparatus for carrying out the same have been described as applied to the purification of magnesium hydroxide, not only because good results have been secured as applied to this material, but further because the purification of magnesium hydroxide has presented a distinct problem in the art, which has been solved by the present invention.

My process can best be understood after a detailed description of the apparatus illustrated in the drawing. This apparatus consists of a treatment vessel 10, adapted to retain a suitable washing liquor, such as water. As means for continuously introducing wash liquor into the lower portion of vessel 10, I have shown a hollow head or mushroom 11, the upper wall of which is provided with a plurality of apertures, and which is connected to a liquid supply pipe 12. In order to continually remove wash liquor from the upper portion of vessel 10, in such a manner as to maintain a column of the liquor within the same, there is shown an overflow pipe 13.

As a means for mechanically forming flocs of the magnesium hydroxide being treated, arranged within the upper portion of vessel 10, there is a container 14. The bottom wall or plate 16 of container 14 is provided with a plurality of spaced apertures which for good results with magnesium hydroxide, can be round and of approximately $\frac{1}{32}$ to $\frac{1}{16}$ of an inch in diameter, having sharp and even end edges, and spaced about $\frac{1}{16}$ to $\frac{1}{4}$ of an inch apart.

As means for introducing the magnesium hydroxide into container 14 at a constant flow rate, I have shown a pump 17, having its suction line connected to a storage tank 18. The discharge line 19 from pump 17 leads to a receptacle 21. Material from receptacle 21 is adapted to discharge into a container 14, as indicated by pipe line 22. An overflow pipe line 23, connected to receptacle 21, leads back to the storage tank 18. With such an arrangement a constant head of material will be maintained in receptacle 21, to cause a constant rate of flow thru line 22, and thus cause a predetermined head of material to be maintained in container 14 above plate 16.

In order to remove treated magnesium hydroxide from vessel 10, I have shown a pipe line 26, communicating with the lower end of vessel 10, and leading to a storage tank 27.

Before explaining the process of my invention, as carried out by the apparatus just described, it should be pointed out that the material to which the process is particularly applicable, is a suspension of finely divided magnesium hydroxide in water. Such a suspension is produced commercially by the precipitation of magnesium hydroxide from brines containing magnesium salts, such as sea water. Calcium hydroxide is commonly employed as a precipitating agent. The precipitated magnesium hydroxide is permitted to settle by gravity, and is removed from the settling tank as a slurry.

The physical characteristics of magnesium hydroxide produced from brines as outlined above, may vary somewhat in accordance with different conditions. For example where the reaction is carried out with comparatively substantial amounts of calcium hydroxide in free solution, the precipitate is largely amorphous in form, having a very slow or even negligible settling rate in water. If the precipitation of magnesium hydroxide from brine is carried out as disclosed in copending application Ser. No. 608,202, filed in the joint names of Farnsworth and Montgomery, the material has a substantial settling rate, but the particles of magnesum hydroxide are still in finely divided form. In any event the magnesium hydroxide slurry produced by precipitation from brines is in the form of a suspension, in which the particles of magnesium hydroxide are in finely divided form, and in which the magnesium hydroxide holds, more or less tightly bound, varying amounts of water of hydration. Likewise this suspension contains certain amounts of soluble salts from the brine, as for example sodium chloride, and unless such impurities are largely removed by subsequent treatment, magnesium products manufactured from such a suspension will be contaminated. However washing of this suspension, to remove undesired soluble impurities, presents a distinct problem which has not satisfactorily been solved in the past. If the suspension is more or less in the amorphous form, it will retain impurities tenaciously, and it will not allow the passage of water on a filter under practical conditions. Washing by prior counter-current methods also involves practical difficulties and considerable expense. The same difficulties, but to a somewhat lesser degree, are experienced where the suspension is produced by a process as set forth in said copending application Ser. No. 608,202.

I have discovered a peculiar characteristic of magnesium hydroxide suspensions produced from brines as explained above, namely in that such material can be formed mechanically into flocks, and that these flocks will progress downwardly at a fairly rapid rate thru a column of wash liquor, such as water, without being physically broken up, that is without losing their physical identity. This is probably due to the fact that such a material is of a hydrous nature, that is, it tends to take up and hold water, and to adhere together when formed into a flock. I have also found that while such flocks are in contact with the wash liquor, soluble impurities of the flocks are dissolved or leached by the liquor. The term "flocks" as employed herein has reference to substantially continuous or broken filaments, or like masses of such dimensions that they are amenable to purification when in a wash liquor.

Referring again to the apparatus illustrated in the drawing, it will be presumed that tank 18 contains a magnesium hydroxide suspension, produced by precipitation from brine as outlined above. Assuming that pump 17 is operating continously, a constant head of this material will be maintained in receptacle 21, and any excess will be returned to tank 18. A stream of suitable washing liquor, such as water, is continuously introduced into vessel 10, thru pipe 12. An upwardly moving column of this liquor is thus maintained within vessel 10, and at the top of the vessel a continuous overflow occurs thru pipe 18. Assuming now that the magnesium hydroxide suspension is introduced into container 14 at a constant rate, a given head of this material will be maintained above plate 16, and the material is extruded thru the apertures in plate 16 in the form of filamentary artificial flocks. It should be noted at this point that plate 16 is below the surface of the column of liquid in tank 10. Therefore the filamentary flocks being extruded from plate 16, pass directly into the washing liquor, instead of being permitted to drop upon the surface of the liquor. The flocks progress downwardly thru the column of liquid in vessel 10, without being physically decomposed, or in other words without losing their physical identity. During downward progression of the flocks soluble impurities are dissolved or leached by the wash liquor, so that by the time the flocks reach the lower portion of the vessel 10, they are relatively free from soluble impurities. After passing below the point of introduction of the wash liquor, that is below the level of mushroom 11, the artificial flocks reach a zone of relative quiescence, where they lose their identity in the mass of material, to enable removal thru pipe line 26.

It is evident that the column of wash liquor should be sufficiently high to enable a time period of contact between the artificial flocks and the wash liquor, which will afford the desired degree of washing. In general it may be said that I have secured good results by utilizing water columns of from 12 to 30 feet in height, although a column 30 inches high will function under certain conditions.

It may also be explained that the rate of diffusion of soluble impurities from a given flock, will depend somewhat upon the exposed surface area of the flock in contact with the wash liquor, and upon the physical dimensions of the flock. Elongated filamentary flocks of relatively small cross sectional area, which are not sufficiently small as to cause repulping of the material with the water, are to be preferred. The length of the individual flocks may also vary in practice. They may be relatively long threads, or shorter and needle-like in form.

The head of material maintained in container 14, should be adjusted to a value which will give best results. I prefer to maintain an effective head of approximately three inches above plate 16, although heads varying from a fraction of an inch to about 1 foot may give satisfactory results under certain conditions. In this connection note that the effective head should not be so great as to cause turbulence within the flocks, as these flocks are being extruded. Such turbulence would tend to cause repulping with the wash liquor.

Since the process depends upon maintenance of mechanically formed flocks, as these flocks progress downwardly thru the column of wash liquor, the concentration of the magnesium hydroxide suspension should be sufficiently high to attain the desired results. In general it may be stated that a concentration of above 10 to 15 grams of magnesium hydroxide per liter, has been employed with success.

It is evident that my invention affords a practical solution of the problem of purifying magnesium hydroxide suspensions produced by precipitation from brines, and that it makes possible a high degree of purification in a simple and inexpensive manner, without the use of complicated equipment. In practice it has been found possible with my invention to wash a suspension containing 52 grams of magnesium hydroxide per liter of suspension, and 20 grams of sodium chloride impurity per liter of suspension, by means of a column of water 5 inches in diameter and 12 feet high. The material removed continuously from the bottom of the column is a suspension containing 40 grams of magnesium hydroxide per liter and only 0.9 grams of sodium chloride per liter. The reduction of the magnesium hydroxide content of the washed suspension is due to slight dilution. The capacity of such a column was about 13 gallons of the original suspension per hour.

While my invention has been described as applied to the particular problem of purifying a magnesium hydroxide suspension obtained by precipitation from brine, I anticipate that the process can be employed with other materials of a like characteristic, where it is desired to remove one or more soluble impurities.

I claim:
1. In a process for removing soluble salts from magnesium hydroxide, forming filamentary flocks from a hydrous slurry of magnesium hydroxide, causing said flocks to be immersed in a body of wash water whereby the soluble salts are extracted without substantial change in the physical form of the flocks and without substantial diffusion of the magnesium hydroxide in the wash water, and then causing the flocks to merge into a substantially undiluted mass for removal.

2. In a process for the manufacture of purified magnesium products, precipitating magnesium hydroxide from brine containing convertible magnesium salts to obtain a hydrous slurry of magnesium hydroxide, forming filamentary flocks from the slurry, causing said flocks to be immersed in a body of wash water whereby the soluble salts from the slurry are extracted without substantial change in the physical form of the flocks and without substantial diffusion of the magnesium hydroxide in the wash water, and then causing the flocks to merge into a substantially undiluted mass for removal.

3. In a process for the manufacture of purified magnesium products, characterized by the use of a body of wash water, forming filamentary flocks from a hydrous slurry of magnesium hydroxide beneath the surface of the wash water, causing the flocks to progress through the wash water whereby soluble salts are extracted without substantial change in the physical form of the flocks and without substantial diffusion of the magnesium hydroxide in the wash water, and then causing the flocks to merge into a substantially undiluted mass for removal.

WILLIAM H. FARNSWORTH.